United States Patent Office 2,953,453
Patented Sept. 20, 1960

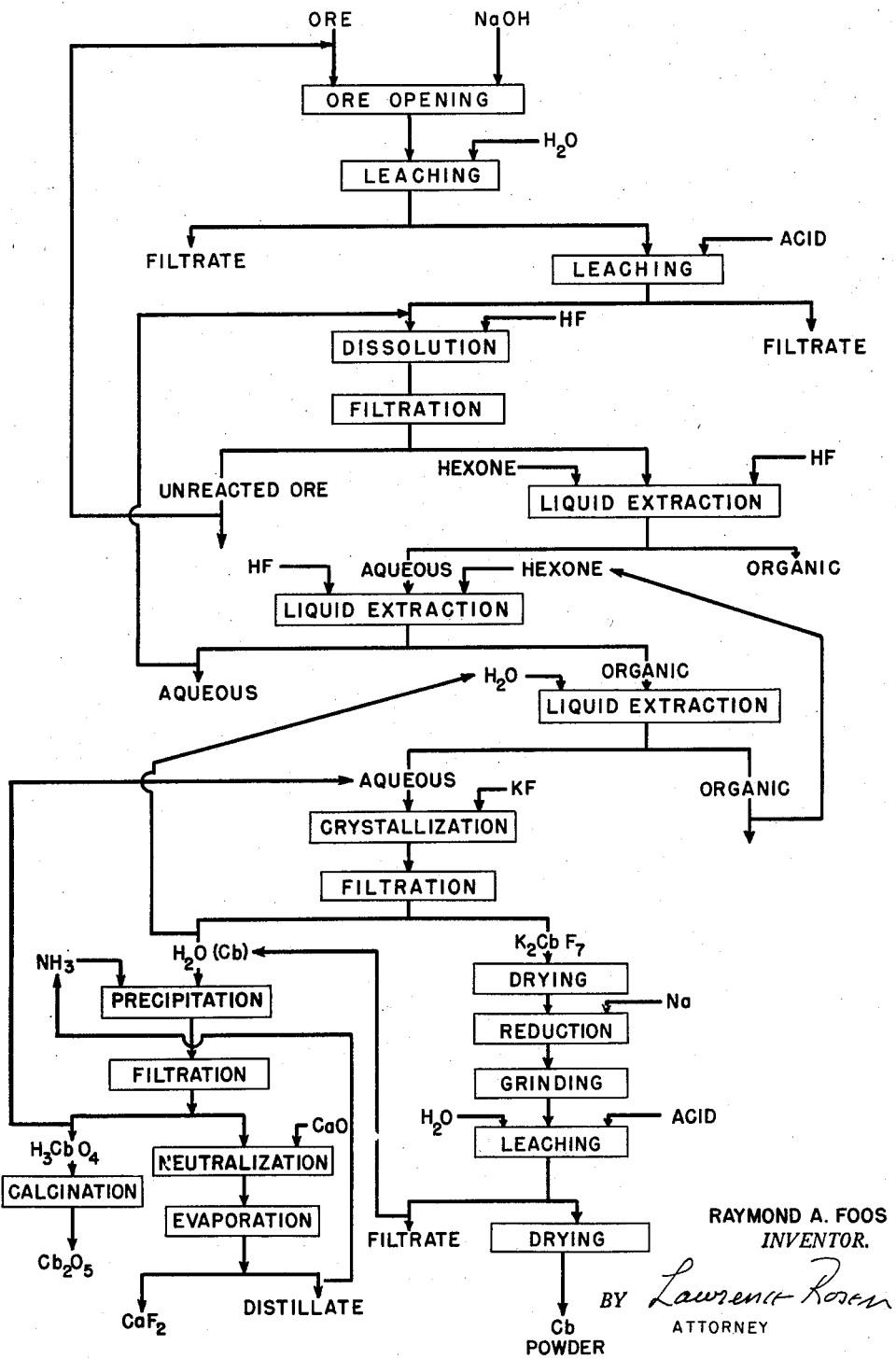

2,953,453

RECOVERY OF COLUMBIUM VALUES

Raymond A. Foos, Cincinnati, Ohio, assignor to National Distillers and Chemical Corporation, New York, N.Y., a corporation of Virginia Filed June 20, 1958, Ser. No. 743,250

15 Claims. (Cl. 75—121)

This invention relates to a new and improved process for the recovery of columbium values from ores. More particularly, the invention is concerned with a method for the preparation of columbium metal and certain columbium compounds.

Columbium, often referred to as niobium, is normally associated in nature with tantalum as in the well known columbite-tantalite ores. These ores usually contain columbium and tantalum pentoxides together with ferrous and manganous oxides. The oxides of such elements as silicon, tin, titanium, aluminum, tungsten, molybdenum and vanadium as well as combined sodium may also be present in minor amounts as impurities. Since for many commercial purposes, such as applications in nuclear reactors, high temperature alloys, etc., substantially pure columbium metal or compounds thereof are used, it is necessary to provide a process which will effectively separate the columbium values from tantalum, which has a relatively higher cross section, and the other metallic impurities which may be present in the ore. The columbium products which are obtained by the present processes cost about fifty to sixty dollars a pound even though the raw material cost is only about two dollars a pound. Therefore, in order to make columbium metal and products thereof more commercially available, more efficient and inexpensive processing is required.

One object of this invention is to provide a commercially attractive process for the separation and purification of columbium values. Another object is to provide an effective continuous process for the recovery of columbium values from columbium-containing materials in high yields. Other objects will become apparent from the ensuing description of the invention.

In accordance with the present invention, it has been found that the foregoing objects may be accomplished by treating a columbium-containing material in certain definite sequential steps, as hereinafter described with particular reference to the accompanying drawing which is a flow sheet of the inventive process.

I. ORE OPENING

Columbite ores, slags and concentrates are useful as starting materials in the process of this invention. These ores contain a major proportion of columbium pentoxide and a minor proportion of tantalum pentoxide. In addition, the other major impurities which may be present will be manganous oxide, ferrous oxide, silicon dioxide, tin dioxide, titanium dioxide, aluminum oxide, etc. An example of such an ore is one obtained from Nigeria having the following composition:

| | Wt. percent |
|---|---|
| $Cb_2O_5$ | 61.85 |
| $Ta_2O_5$ | 7.55 |
| $TiO_2$ | 1.60 |
| $SnO_2$ | 4.34 |
| FeO | 17.85 |
| $MnO_2$ | 0.56 |
| Others | 6.25 |

In general, those ores containing from about 20 to 80% columbium pentoxide are preferred, though it will be understood that even ores containing less than about 5% by weight of columbium pentoxide also may be processed in accordance with this invention.

The first step in the process involves opening the columbite ores to facilitate the separation of the columbium from the tantalum and other impurities. This can be accomplished by any one of the following methods:

(1) Caustic fusion utilizing sodium hydroxide, potassium hydroxide, sodium carbonate;
(2) Treatment with sulfuric acid; or
(3) Treatment with hydrofluoric acid.

Such severe ore opening procedures are required in view of the relatively insoluble characteristics of the columbium constituents. It will be further understood that other ore opening methods, including modifications of those listed above, may also be employed. However, the caustic fusion and the sulfuric acid beneficiation methods have been found to be most suitable for this purpose.

For a more complete understanding of this particular step, the opening of a columbite ore fusion with sodium hydroxide will be described in detail. The ore is first mixed with sodium hydroxide in an ore to sodium hydroxide ratio of about 1:0.75 to 1:1.5. In general, it has been found advantageous to use an amount of sodium hydroxide which is in excess of that amount theoretically required to react with the ore. By utilizing an excess of sodium hydroxide within the range of about 10 to 30 wt. percent the amount of unreacted ore was substantially reduced. In order to effect the fusion, the reaction mixture is heated to a temperature within the range of about 250° to 600° C., preferably about 300° to 350° C., for about 0.5 to 2 hours.

The following are typical reactions which are believed to occur during fusion:

(1) $Cb_2O_5 + 6NaOH \rightarrow 2Na_3CbO_4 + 3H_2O$
(2) $Ta_2O_5 + 6NaOH \rightarrow 2Na_3TaO_4 + 3H_2O$
(3) $TiO_2 + 2NaOH \rightarrow Na_2TiO_3 + H_2O$
(4) $FeO + 2NaOH \rightarrow Na_2FeO_2 + H_2O$
(5) $MnO + 2NaOH + O_2 \rightarrow Na_2MnO_4 + H_2O$
(6) $SnO_2 + 2NaOH \rightarrow Na_2SnO_3 + H_2O$
(7) $SiO_2 + 2NaOH \rightarrow Na_2SiO_3 + H_2O$ The fused ore, commonly referred to as frit, is removed from the reaction vessel and crushed in conventional apparatus, such as a jaw crusher, to produce a finely divided material, which is more easily handled and treated in the subsequent operations.

In carrying out this fusion step, it is also preferred to crush or grind the crude ore to obtain a feed material having a particle size of less than about 100 mesh, though ores having a greater particle size may be employed.

II. LEACHING

The ground fused columbite ore product is next subjected to certain specific leaching operations to remove undesirable metal contaminants from the columbium salt. The fused ore is first washed with water to remove excess sodium hydroxide and other contaminants such as silica, tin, alumina, tungsten, molybdenum, vanadium, etc. The fused ore is then washed with an aqueous sodium hydroxide solution having a molarity of at least one to complete the removal of silicon, tin, aluminum, and sodium from the insoluble columbium and tantalum salts while preventing solubilization of tantalum or columbium. The insoluble residue recovered from this treatment is leached with a mineral acid such as nitric, hydrochloric or sulfuric. In accordance with the preferred method of this invention, the acid leach solution comprises hot sulfuric acid, 1.0 to 3.0 N. Reducing agents such as iron powder or sodium peroxide are added to the leach solution during leaching to convert manganese to a soluble form; the use of iron powder is preferred. In addition to removing such metallic impurities as iron, manganese, nickel, magnesium, sodium, etc., the acid leaching serves to convert the insoluble sodium salts of tantalum and columbium into the corresponding acids or hydrated oxides as follows:

(1) $2Na_3CbO_4 + 3H_2SO_4 \rightarrow 2H_3CbO_4 + 3Na_2SO_4$ (2) $2Na_3TaO_4 + 3H_2SO_4 \rightarrow 2H_3TaO_4 + 3Na_2SO_4$ These columbium and tantalum acid products are insoluble, and they are readily separated from most of the water, sodium sulfate and other impurities as an ore concentrate. The ore concentrate assays from 90 to 98% $Cb_2O_5$—$Ta_2O_5$ on a dry basis with the remaining material composed of traces of $TiO_2$, $MnO$, $SiO_2$, $FeO$ and $SnO_2$.

III. SEPARATION OF COLUMBIUM FROM TANTALUM

The insoluble columbium and tantalum acids recovered from the residue are contacted with hydrofluoric acid to effect the following conversions:

(1) $H_3TaO_4 + 7HF \rightarrow H_2TaF_7 + 4H_2O$ (2) $H_3CbO_4 + 5HF \rightarrow H_2CbOF_5 + 3H_2O$ In carrying out this treatment, it has been found to be essential to employ a minimum of excess fluoride ion in order to avoid the following reaction:

(3) $H_2CbOF_5 + 2HF \rightarrow H_2CbF_7 + H_2O$

If Reaction 3 is allowed to proceed, e.g., by use of an excess of HF, the separation of the columbium values from the tantalum values is more difficult. By directing the process to Reactions 1 and 2, the subsequent separation is made easier, since $H_2TaF_7$ favors an organic phase while the $H_2CbOF_5$ favors an aqueous phase. When the amount of hydrofluoric acid employed is carefully controlled, undesirable reactions with the production of tantalum compounds which would favor the aqueous phase and columbium compounds which would favor the organic phase, are avoided. One method of controlling the amount of hydrofluoric acid employed would be the use of an excess of the insoluble tantalic and columbic acids. Any unreacted material could be readily separated from the resulting reaction product mixture before separating the fluotantalate and pentafluocolumbate from each other. In general, 10 to 30 N hydrofluoric acid will be employed in this step, to dissolve the columbic and tantalic earth acids.

Following treatment with hydrofluoric acid the reaction product mixture is filtered to remove unreacted oxide, unreacted ore and other solids. The clear solution having a pH of from about 0.5 to 2.5 so obtained is then fed into an extraction system wherein it is countercurrently contacted with a water-immiscible organic solvent to selectively separate the columbium salt from the tantalum salt. Examples of operable solvents include methyl isobutyl ketone (hexone), diethyl ketone, cyclohexanone, tributyl phosphate, diethyl ether, amyl alcohol, 1–25% triisooctylamine in a hydrocarbon diluent, 1–25% Rohm and Haas Primene 81–JM–T in kerosene (or turpentine, heptane, fuel oil, etc.), m-toluidine, etc.

The tantalum salts preferentially transfer to the organic solvent phase, while the columbium and minor impurities remain in the aqueous phase. This extraction step may be carried out at a temperature within the range of about 5° to 100° C., though temperatures up to the boiling point of the organic extractant may be employed, with approximately 20 to 30° C. being preferred. Hydrofluoric acid is added to the aqueous solution until a 3 to 12 N solution in terms of additional hydrogen ion has been reached. The following reaction occurs:

$$H_2CbOF_5 + 2HF \rightarrow H_2CbF_7 + H_2O$$

The hydrogen ion concentration can also be obtained by addition of other mineral acids thus minimizing the use of the more expensive hydrofluoric acid. The fluocolumbate product is then extracted with a fresh portion of methyl isobutyl ketone (hexone) or any one of the organic solvents listed above. This columbium compound is transferred to the organic solvent phase, while the impurities such as titanium, iron, silicon, aluminum, manganese, nickel, tin, etc. remain in the aqueous phase. The aqueous feed to organic solvent ratio will be about 1:10 to 10:1.

The organic solvent phase containing the columbium salt is next scrubbed with water, an organic to aqueous ratio of about 1:0.5, to obtain an aqueous extract containing the columbium values with an equivalent columbium oxide concentration of about 200–400 grams per liter. The organic phase recovered from this extraction step may be advantageously recycled to the previous extraction step wherein the columbium values were extracted from their impurities.

IV. CRYSTALLIZATION

The fluocolumbate in the aqueous solution is converted to the double salt by reaction with an inorganic potassium-containing compound such as potassium fluoride, potassium carbonate, potassium chloride, potassium hydroxide, etc. as illustrated below:

(1) $H_2CbF_7 + 2KF \rightarrow K_2CbF_7 + 2HF$, or (2) $H_2CbF_7 + 2KOH \rightarrow K_2CbF_7 + H_2O$, etc.

This reaction is preferably carried out at a temperature of about 20° to 60° C., with a mol ratio of the potassium compound to columbium of about 1.9:1 to 2.5:1. Prior to the addition of the potassium compound, potassium fluoride being preferred, it has been found advantageous to heat the columbium solution containing about 100 to 300 grams of columbium per liter to about 70° C. A minmum free hydrogen ion concentration of about 1.0 to 3.0 N is required. After the reaction is completed, the resulting reaction product mixture is cooled to a temperature of about 5° to 20° C. to precipitate the potassium fluocolumbate as a crystalline solid, which is then filtered and dried at a temperature of about 50° to 110° C.

V. REDUCTION

The dried potassium fluocolumbate may be reacted with known alkali metal reducing agents such as sodium, potassium, lithium, etc. or mixtures thereof to produce columbium metal. In general, the use of metallic sodium as the reducing agent is preferred. The reaction is as follows:

$$K_1CF_7 + 5Na \rightarrow 5NaF + 2KF + Cb$$

The reaction is preferably carried out in an inert atmosphere (e.g., argon, neon or mixtures thereof) at a temperature of about 200° to 700° C., preferably about 400° to 50° C. The reaction mass so obtained is a fused mixture of metallic columbium and salt. The columbium is recovered by grinding or crushing the fused product followed by leaching with water or dilute mineral acids at a temperature of about 20° to 90° C. If desired, the resulting columbium powder may be dried at a temperature of about 50° to 150° C.

Referring again to the flow sheet shown in the drawing, it will be seen that numerous commercial advantages can be achieved by utilizing the various recycle and recovery procedures illustrated therein. It should be noted, for example, that unreacted ore recovered when the fluotantalates and fluocolumbates are filtered prior to being subjected to the liquid extraction step may be recycled directly to the ore opening step. The aqueous phase obtained when the columbium salts are extracted from the aqueous raffinate from the first extraction may be recycled to the hydrofluoric acid dissolution step. It is also possible to recycle the aqueous filtrate, obtained from the filtration of the crystallized potassium fluocolumbate, to liquid extraction step wherein the columbium salt is extracted from the organic phase with water. In accordance with another feature of this invention, as shown in the drawing, at least a portion of this aqueous solution may be treated to recover calcium fluoride. This may be accomplished by addition of lime to the ammoniacal filtrate to give the following reaction:

$$2NH_4F + CaO + H_2O \rightarrow CaF_2 + 2NH_4OH$$

A 10–15% excess of lime is preferred. The $CaF_2$ is partially soluble in $NH_4OH$; however, on boiling the solution $NH_3$ (as $NH_4OH$ and $NH_3$) is volatilized to yield an insoluble precipitate of $CaF_2$. The resulting solution, containing NaOH and KOH, is separated from the $CaF_2$ by filtration whereas the $NH_3$ is recirculated to the process and the $CaF_2$ may be employed for HF preparation in accordance with any of the commercial methods. Fluoride recoveries of 60–95% are effected during this step.

Fluoride removal from the fluoride-bearing filtrate can also be effected by addition of sufficient $H_2SO_4$ to convert all fluorides to HF. Reactions are as follows:

$$2NH_4F + H_2SO_4 \rightarrow 2HF + (NH_4)_2SO_4$$
$$2KF + H_2SO_4 \rightarrow 2HF + K_2SO_4$$
$$2NaF + H_2SO_4 \rightarrow 2HF + Na_2SO_4$$

Boiling of this solution yields volatile HF which can be scrubbed in $H_2O$ and recirculated to the concentrate dissolving step.

The invention will be more fully understood by reference to the following illustrative embodiment:

*Example*

A columbite ore having the following composition and particle size was employed in this run.

ORE COMPOSITION

| Component: | Wt. percent |
|---|---|
| $Cb_2O_5$ | 61.9 |
| $Ta_2O_5$ | 7.6 |
| $TiO_2$ | 1.6 |
| $SnO_2$ | 4.3 |
| FeO | 9.0 |
| MnO | 9.0 |
| Others | 6.6 |

PARTICLE SIZE

| Mesh: | Wt. percent |
|---|---|
| 14–28 | 1.0 |
| 28–65 | 13.0 |
| 65–100 | 25.0 |
| 100–200 | 49.0 |
| 200–325 | 11.0 |
| –325 | 1.0 |

A mixture of 300 grams of the columbite ore, ground to an average particle size of less than about 100 mesh, and 300 grams of dry sodium hydroxide pellets was formed in a reactor and heated to 320° C. to initiate the reaction. Heating was continued for about 30 minutes until a temperature of about 420° C. was reached. The reaction mass (referred to as frit) was allowed to cool to about 100° to 150° C., and was then removed from the reactor as a powder. The frit so recovered weighed 533 grams.

A 50 gram sample of the frit was leached at 30° C. with 1.0 M sodium hydroxide in order to remove excess sodium hydroxide and such soluble salts as $Na_2SiO_3$, $Na_2AlO_2$, $Na_2SnO_3$, etc. The volume of leach was equivalent to about 0.5 gallon per pound of ore. To prevent dissolution of any tantalum or columbium, the sodium hydroxide solution is kept at least at 1.0 M concentration.

After filtering the alkaline leach solution, the residue was leached at about 60° to 70° C. for 30 minutes with 3.0 N hydrochloric acid. About 10% excess leach was employed in this step. The cake or ore concentrate obtained from this step comprised essentially $H_3TaO_4$ and $H_3CbO_4$ with minor amounts of titanium, manganese, tin, silicon, aluminum, etc.

To 4640 grams of undried concentrate, prepared as described above, 2143 grams of 65% HF was added. After a reaction time of about one hour, a solution was obtained which contained the equivalent of about 376 grams of tantalum and columbium oxides per liter at a pH of 1.0. The solution was then filtered, and the insoluble residue recycled to the caustic fusion step. The solution recovered from the filtration was then subjected to a seven stage continuous countercurrent extraction step utilizing methyl isobutyl ketone (hexone) as the extractant. In carrying out this extraction, the feed solution was fed directly to the fourth stage, the hexone to the first stage, and a countercurrent scrub solution comprising 0.5 M hydrofluoric acid to the seventh stage.

The aqueous product phase, or raffinate, recovered from the first stage contained the equivalent of 155 grams per liter of oxide and assayed about 70.0% $Cb_2O_5$, 20.0% $MnO_2$, 0.05% $Ta_2O_5$, 3.0% FeO, 1.0% $TiO_2$, and 4.5% of minor impurities. Columbium values were removed from the aqueous phase by adding HF to it to increase the HF concentration by 8 N (200 grams per liter of anhydrous HF). The addition of the acid to the feed solution converted $H_2CbOF_5$ to $H_2CbF_7$, which is soluble in an organic solvent. In actual operation 200 ml. of the acidified raffinate was passed countercurrently to 200 ml. of hexone and 15 ml. of 2 N HF scrub solution in a five stage system. About 280 ml. of an organic extract phase was recovered and contained the equivalent of 74 grams per liter of $Cb_2O_5$ which assayed 0.1% $Ta_2O_5$, 0.05% $TiO_2$, 0.02% FeO, 0.01% $MnO_2$ and 0.05% of other impurities. Since the raffinate contained 0.4 gram per liter of $Cb_2O_5$, the overall recovery of high purity $Cb_2O_5$ was greater than 99 percent.

In order to recover the columbium from the organic phase, a three stage countercurrent water extraction system was employed. In operation, 280 ml. of the organic phase was countercurrently extracted with 50 ml. of water. About 135 ml. of an aqueous columbium solution was obtained containing the equivalent of 140 grams per liter of $Cb_2O_5$. The organic solution recovered from this extraction system, which can be recycled, contained only 2 grams per liter of $Cb_2O_5$. The recovery of columbium values was greater than 98 percent.

To 135 ml. of the aqueous columbium-containing solution, maintained at a temperature of about 70° C., 25 grams of potassium fluoride was added. When the solution was cooled to room temperature, $K_2CbF_7$ precipitated. After the precipitate was filtered and dried at 80° C. for three hours, 36 grams of crystalline $K_2CbF_7$ was recovered assaying <0.1% $H_2O$ and 44.2% fluoride. The yield of high purity columbium as $K_2CbF_7$ from crystallization was greater than 80 percent. The columbium values in the filtrate can either be recycled for further scrubbing or treated with ammonium hydroxide to prepare high purity $Cb_2O_5$.

About 304 grams of the dried $K_2CbF_7$ were mixed with 116 grams of sodium, and the mixture maintained under an atmosphere of argon. The mixture was gradually heated to a temperature of about 300° C., at which point the reaction commences and a 200° C. temperature increase results. The reaction mixture was sintered at 300° C. for eight hours, cooled to room temperature and the spalt (mixture of columbium metal and by-product salts) removed from the reaction vessel. The spalt was next ground to an average particle size of less than about 12 mesh and then leached with dilute hydrochloric acid until the leach liquor was fluoride-free. The columbium powder so obtained was melted into an ingot weighing 90 grams, representing a yield of about 98%. The columbium ingot had a Brinell hardness of 150 and contained <0.02% fluoride ion. Detectable metal impurities were as follows: 100 p.p.m. Fe, 25 p.p.m. Cr, <20 p.p.m. Ni, 250 p.p.m. Si, <20 p.p.m. Al, and <25 p.p.m. Ca.

While particular embodiments of this invention are shown above, it will be understood that the invention is obviously subject to modifications without departing from its broader aspects.

What is claimed is:

1. A process for recovering columbium values from columbium-containing material which comprises (a) reacting said columbium-containing material with a substance selected from the group consisting of sodium hydroxide, potassium hydroxide, sulfuric acid and hydrofluoric acid, (b) leaching the resulting reaction mixture with water to remove water-soluble impurities, (c) leaching the water-leached reaction mixture with an acid selected from the group consisting of nitric, hydrochloric and sulfuric to remove acid-soluble metallic impurities, (d) reacting said leached reaction mixture with hydrofluoric acid to obtain a mixture containing fluocomplexes of columbium in accordance with the following reaction:

$$H_3CbO_4 + 5HF \rightarrow H_2CbOF_5 + 3H_2O$$

(e) contacting said fluocomplex mixture with a water-immiscible, organic solvent and separately recovering an organic solvent phase rich in impurities and an aqueous phase rich in columbium fluocomplexes, (f) contacting said aqueous phase with additional hydrofluoric acid to obtain the following reaction:

$$H_2CbOF_5 + 2HF \rightarrow H_2CbF_7 + H_2O$$

(g) contacting the resulting reaction mixture with a water-immiscible, organic solvent and separately recovering an aqueous phase containing impurities and an organic solvent phase containing said columbium fluocomplexes, (h) extracting said organic solvent phase with water to obtain an organic solvent phase and an aqueous extract phase containing said columbium fluocomplexes, (i) reacting the columbium fluocomplexes in said extract phase with a potassium compound to obtain a potassium fluocolumbate salt, (j) reducing said potassium fluocolumbate salt with an alkali metal reducing agent to obtain a reaction product mixture containing columbium metal and (k) recovering the columbium metal from said reaction product mixture.

2. The process of claim 1 wherein said columbium-containing material is a columbite ore.

3. The process of claim 1 wherein said columbium-containing material is initially reacted with sodium hydroxide at a temperature of about 250° to 600° C.

4. The process of claim 1 wherein said acid leach solution contains a reducing agent.

5. The process of claim 1 wherein said columbium fluocomplexes are filtered to recover unreacted columbium-containing material, and said recovered material is recycled to step (a).

6. The process of claim 1 wherein the aqueous phase recovered in step (f) is recycled to step (d).

7. The process of claim 1 wherein said water-immiscible organic solvent is methyl isobutyl ketone.

8. The process of claim 1 wherein said potassium compound is potassium fluoride.

9. The process of claim 1 wherein said alkali metal reducing agent is sodium.

10. The process of claim 1 wherein said reaction product mixture of step (j) is ground and leached with a leach solution selected from the group consisting of water and dilute mineral acid.

11. The process of claim 1 wherein the reaction product mixture obtained in step (i) is filtered, and the aqueous filtrate is recycled to step (h).

12. A process for recovering columbium values from a columbite ore which comprises (a) reacting said columbite ore with sodium hydroxide at a temperature within the range of about 250° to 600° C. to effect fusion and to obtain frit, (b) leaching the frit with an aqueous solution of at least 1 M sodium hydroxide to remove water-soluble acidic materials, (c) leaching the so-treated frit with an acid selected from the group consisting of nitric, hydrochloric acid, and sulfuric, said acid leach solution containing a reducing agent, to remove metallic impurities, (d) reacting said acid-leached frit with hydrofluoric acid to obtain the fluocomplexes of columbium in accordance with the following reaction:

$$H_3CbO_4 + 5HF \rightarrow H_2CbOF_5 + 3H_2O$$

(e) contacting the resulting reaction mixture with a water-immiscible, organic solvent and separately recovering an organic solvent phase rich in impurities and an aqueous phase rich in said columbium fluocomplexes, (f) contacting said aqueous phase with additional hydrofluoric acid to obtain the following reaction:

$$H_2CbOF_5 + 2HF \rightarrow H_2CbF_7 + H_2O$$

(g) contacting the reaction product mixture of step (f) with a water-immiscible organic solvent and separately recovering an aqueous phase containing impurities and an organic solvent phase with said columbium fluocomplexes, (h) extracting said organic solvent phase with water to obtain an organic solvent phase and an aqueous extract phase containing said columbium fluocomplexes, (i) reacting the columbium fluocomplexes in said aqueous extract phase with a potassium-containing compound to obtain a potassium fluocolumbate salt, (j) reducing said potassium fluocolumbate salt with metallic sodium to obtain a reaction product mixture containing columbium metal and (k) recovering the columbium metal from said reaction product mixture.

13. The process of claim 12 wherein said columbite ore feed has an average particle size of less than about 100 mesh.

14. The process of claim 12 wherein said acid leach is sulfuric acid.

15. The process of claim 12 wherein said potassium-containing compound is potassium fluoride.

References Cited in the file of this patent

UNITED STATES PATENTS

| | | |
|---|---|---|
| 2,773,737 | Nielson et al. | Dec. 11, 1956 |
| 2,795,481 | Hicks et al. | June 11, 1957 |

OTHER REFERENCES

Rohmer: "Chemical Abstracts," vol 36, col. 364 (1942).